United States Patent [19]

Tajima et al.

[11] Patent Number: 4,700,792

[45] Date of Patent: Oct. 20, 1987

[54] INDICATION METHOD IN BALANCE WITH ITEM INDICATOR

[75] Inventors: Noriyasu Tajima; Yasuhiro Sakura; Takashi Futakata; Kouji Senda; Kazuaki Seki, all of Shizuoka, Japan

[73] Assignee: Tokyo Electric Co., Ltd., Tokyo, Japan

[21] Appl. No.: 861,410

[22] Filed: May 9, 1986

[30] Foreign Application Priority Data

May 15, 1985 [JP] Japan .................................. 60-103531

[51] Int. Cl.⁴ ...................... G01G 23/32; G01G 23/22
[52] U.S. Cl. ......................................... 177/178; 177/25
[58] Field of Search ................. 177/DIG. 1, 177, 178, 177/25.15

[56] References Cited

U.S. PATENT DOCUMENTS

| | | | |
|---|---|---|---|
| 1,030,879 | 7/1912 | Emanuel | 177/177 |
| 2,408,942 | 10/1946 | Meeker et al. | 177/177 |
| 3,826,319 | 7/1974 | Loshbough | 177/DIG. 1 |

FOREIGN PATENT DOCUMENTS 55146561  4/1954  Japan .
57196337  6/1956  Japan .

Primary Examiner—George H. Miller, Jr.
Attorney, Agent, or Firm—Oblon, Fisher, Spivak, McClelland, & Maier

[57] ABSTRACT

The present invention provides effective utilization of an item indicator by storing messages to be indicated by the item indicator in a memory and indicating the messages stored in the memory on the item indicator when data from a balancing section become zero and this condition continues for a fixed time.

4 Claims, 7 Drawing Figures

FIG. I

INDICATION METHOD IN BALANCE WITH ITEM INDICATOR

FIELD OF THE INVENTION AND RELATED ART STATEMENT

The present invention relates to a balance for measuring the weight of articles and indicating data relating to the articles, and more particularly to an indication method in the balance with an item indicator for indicating an item as one of the data to be indicated.

Generally, this kind of balance is provided with the item indicator, and is adapted to indicate an item upon setting of the item and upon registering of the item by PLU calling.

The aforementioned prior art has the following problem. In a supermarket or the like, it is necessary to transmit to customers messages as to "What is a loss leader on the day?" or "When is a special bargain day?", for example. Such messages are written on a paper for display at present. Under the circumstances, if the messages are indicated on the item indicator during on-operation of the balance, it will be possible to make easy information transmission to the customers and improve image to a store. However, the item indicator is utilized only upon PLU calling at registration of the item and upon setting of the item as mentioned above, and a method of utilizing the item indicator such that the messages are indicated on the item indicator has not been taken into consideration.

OBJECT AND SUMMARY OF THE INVENTION

It is an object of the present invention to provide an indication method in a balance with an item indicator which may be utilized more effectively.

According to the present invention, with use of a balance with an item indicator for indicating an item upon setting of the item and upon registering of the item, necessary messages are preliminarily stored in a memory, and the messages are indicated by the item indicator when data from a balancing section are zero and this condition continues for a fixed time.

DETAILED DESCRIPTION OF PREFERRED EMBODIMENTS

Figure 1:
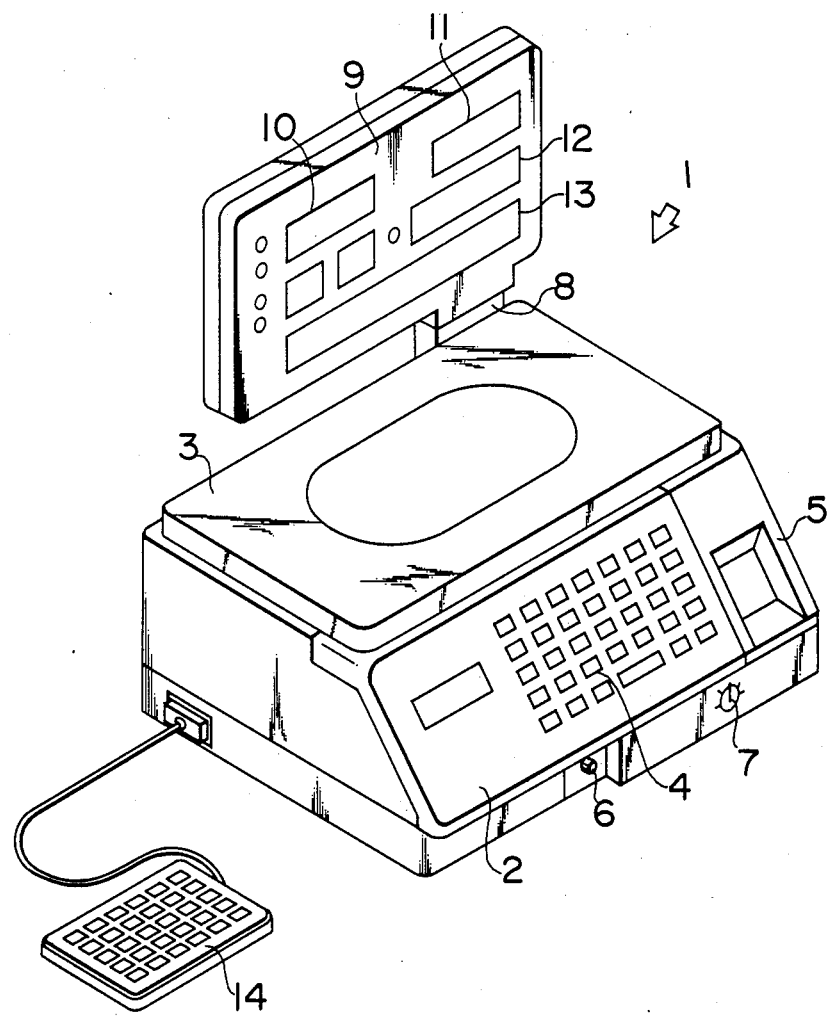
FIG. 1 is a perspective view of the balance with the item indicator in a preferred embodiment of the present invention.

There will be now described a preferred embodiment of the present invention with reference to the drawings. FIG. 1 shows an external form of a balance 1 having an item indicator. A loading plate 3 is provided on the upper surface of a body case 2, while a front key 4 and a printer 5 are provided on the front surface of the body case 2. Further, a zero switch 6 and a registered mode selector switch 7 are provided at the lower portion on the front surface of the body case 2.

A vertical remote pipe 8 is provided at the rear portion of the body case 2, and an indicator unit 9 is mounted to the remote pipe 8. The indicator unit 9 is provided with a weight indicator 10, unit price indicator 11 and price indicator 12, and is also provided with an item indicator 13.

Furthermore, a remote keyboard 14 is connected to the body case 2.

Figure 2:
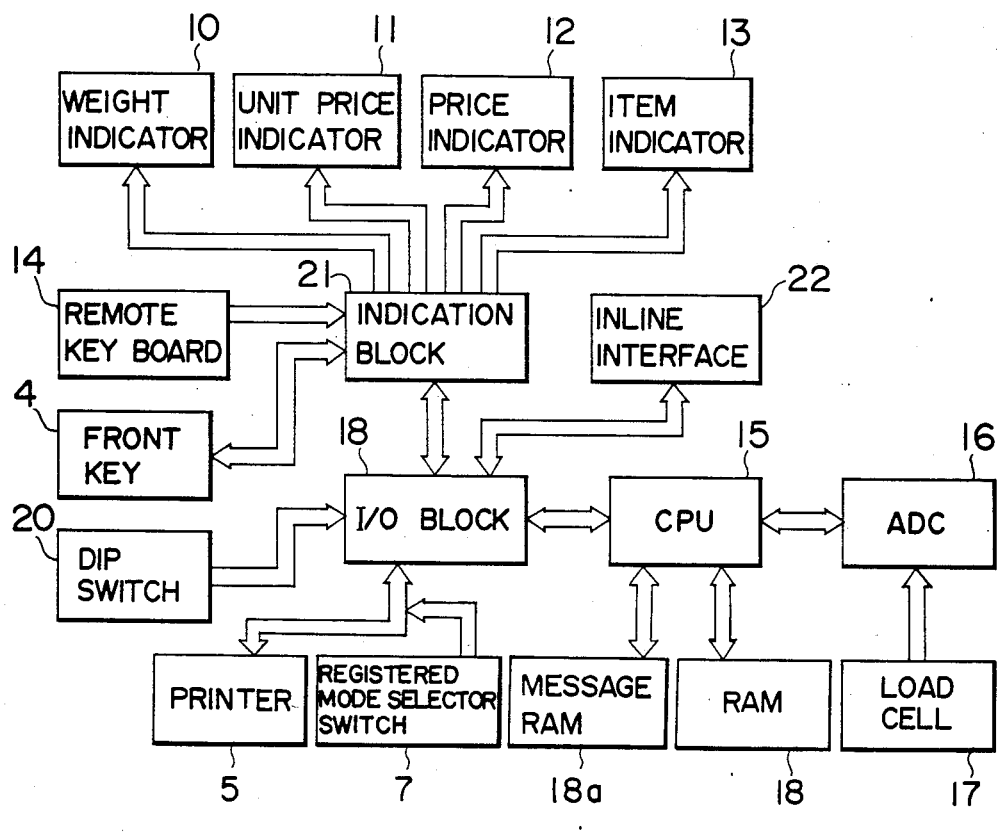
FIG. 2 is a block diagram of the preferred embodiment.

Referring next to FIG. 2 which shows electrical connection, a CPU 15 is incorporated in the body case 2. The CPU 15 is connected through an analog-digital converter 16 to a load cell 17 as a balancing member. The CPU 15 is also connected to a RAM 18 adapted to operate as a memory and a message RAM 18a adapted to operate as a memory for message only. The message RAM 18a is constituted of plural kinds of memories having a capacity for storing plural kinds of messages, which memories are exchangeably connected to the CPU 15. The CPU 15 is further connected through an I/O block 19 to an external circuit. The I/O block 19 is connected to the printer 5 and the registered mode selector switch 7, and is also connected to a dip switch 20 for setting various modes, an indication block 21 and an inline interface 22. The indication block 21 is connected to the front key 4 and the remote keyboard 14, and is also connected to the weight indicator 10, the unit price indicator 11, the price indicator 12 and the item indicator 13.

Figure 3:
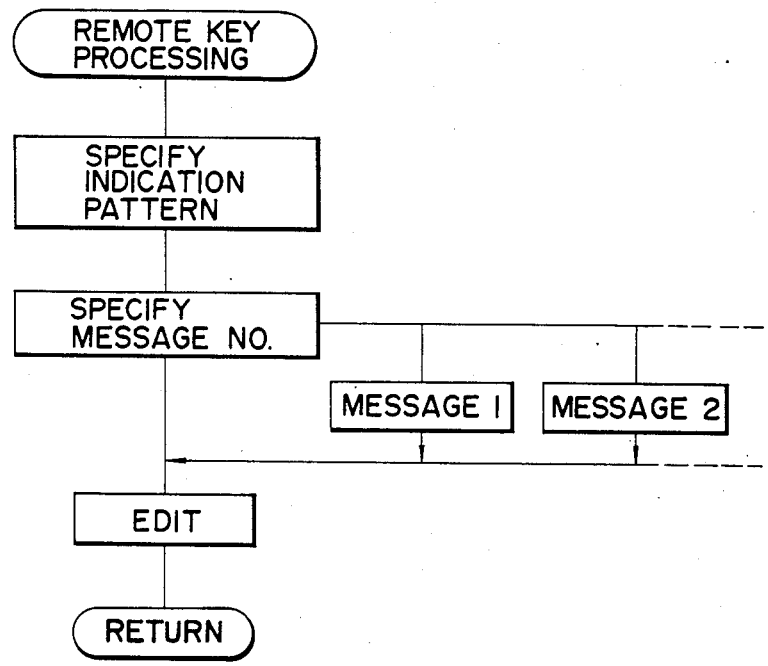
FIG. 3 is a flow chart showing remote key processing upon setting of messages.
Figure 4:
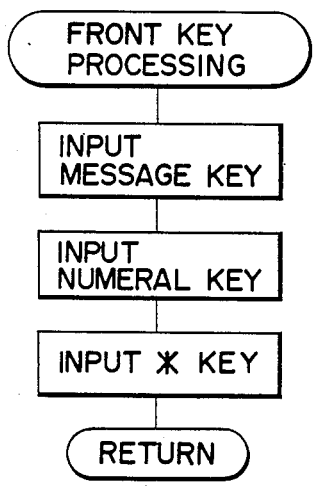
FIG. 4 is a flow chart showing front key processing upon selecting of messages.

In this constitution, setting of indication to the indicator unit 9 is such that characters such as hiragana, katakana, specific kanji or symbols are encoded and they may be input by numerals. Setting of items and messages is conducted by the remote key 14 according to the code, and they are selected by the front key 4. FIG. 3 shows a flow chart of the setting operation of the messages, and FIG. 4 shows a flow chart of the selecting operation thereof. Referring to FIG. 3, processing of the remote key 14 is initiated by selecting an indication pattern in the item indicator 13. The indication pattern includes stationary indication and scroll indication, for example. Then, a message number is specified to thereby select a specific memory area of the message RAM 18a connected to the CPU 15 at this time. Then, an editting operation of the message is conducted by the remote key 14 to permit the message to be set and stored in the memory area of the message RAM 18a as selected. The message RAM 18a includes a memory area where a specific message is preliminarily stored as well as the aforementioned memory area where users may freely write any messages. Referring next to FIG. 4, the front key 4 is operated to input a message key for specifying the selecting operation of the message. Then, a numeral key is input to specify a message number and select a desired message. Then, a * key is input to indicate the selected message.

Figure 5:
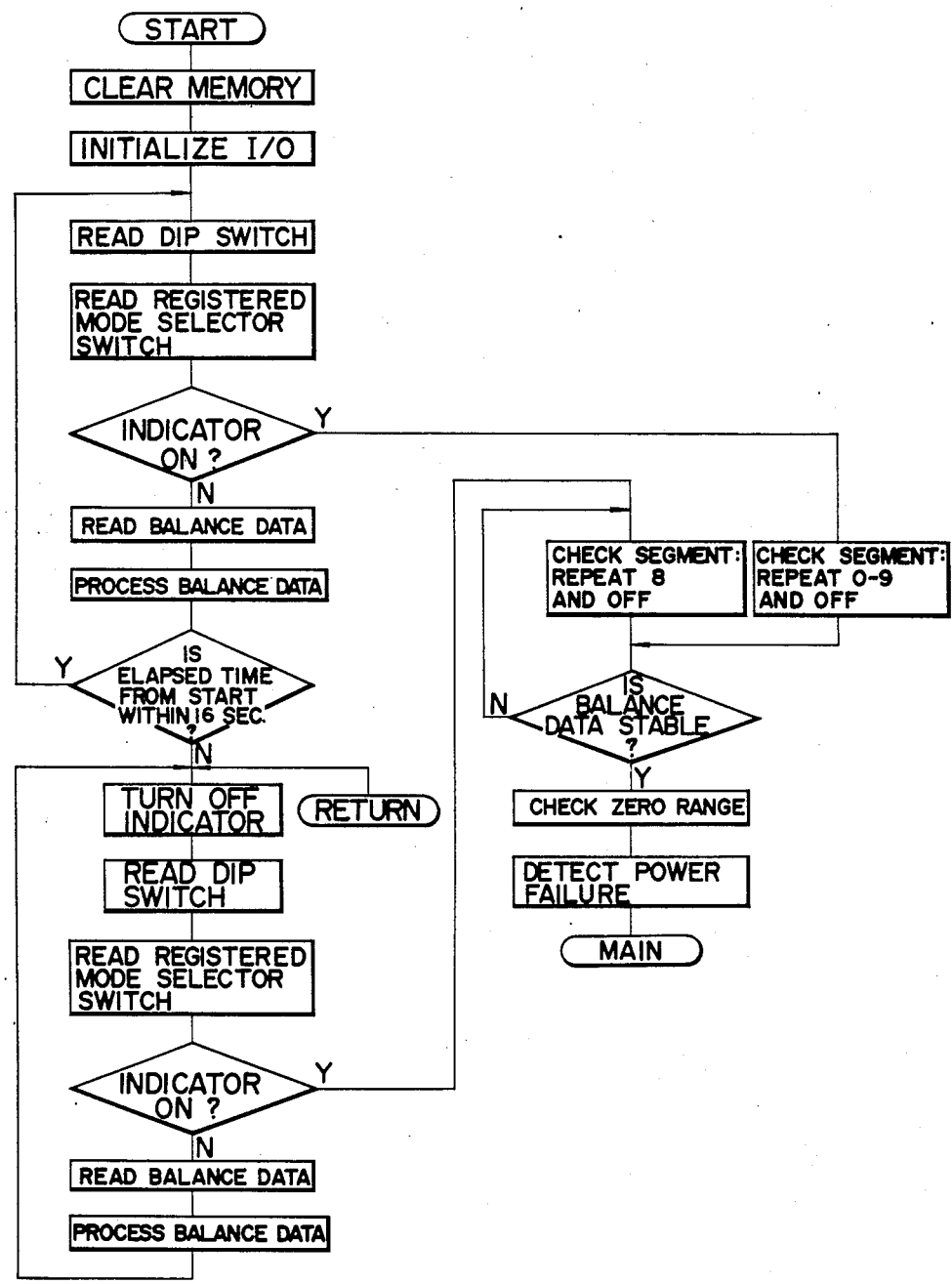
FIG. 5 is a flow chart showing the operation of a preparatory step.
Figure 6A:
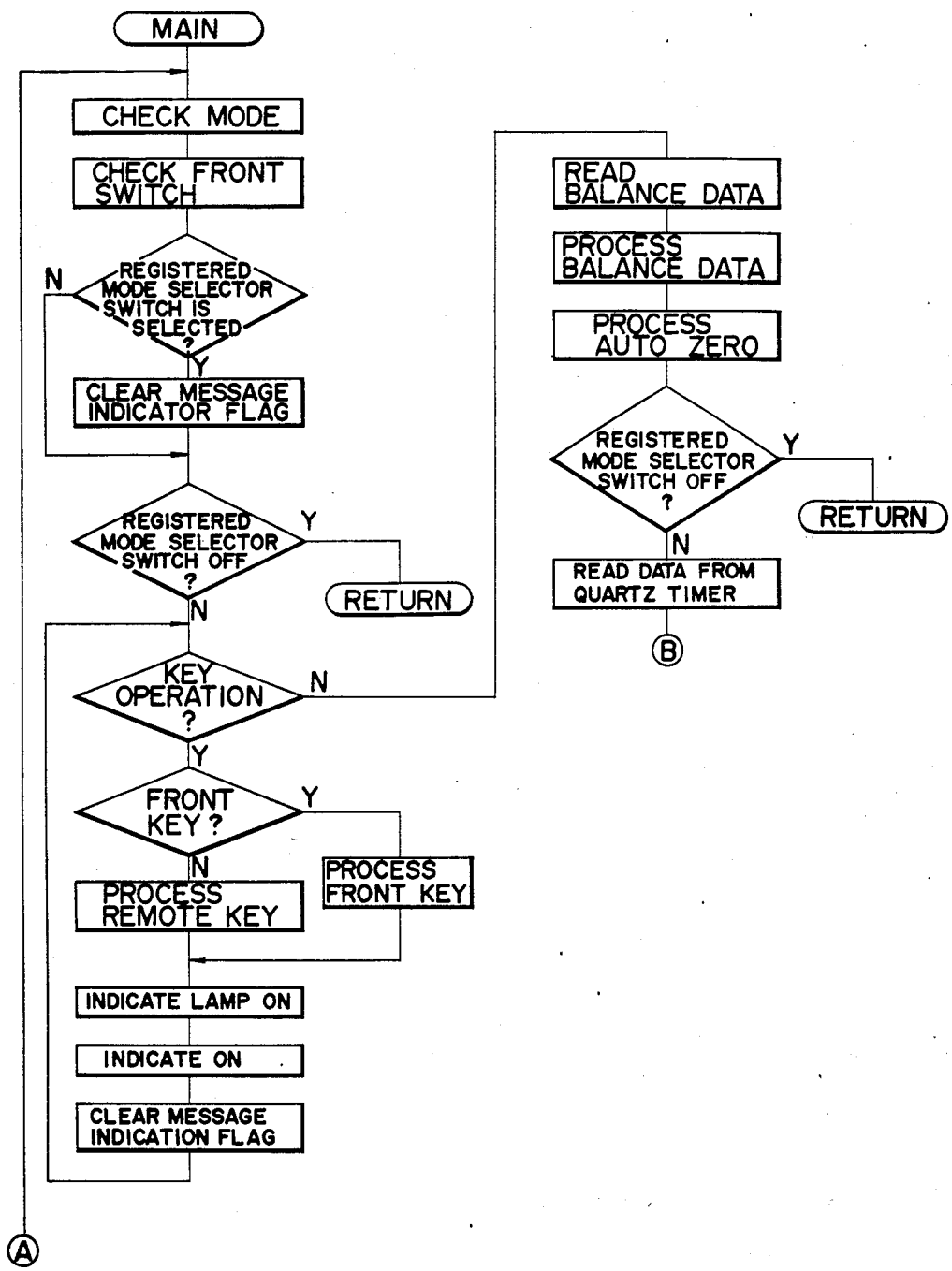
FIGS. 6A and 6B are a flow chart showing the indicating operation in the item indicator.
Figure 6B:
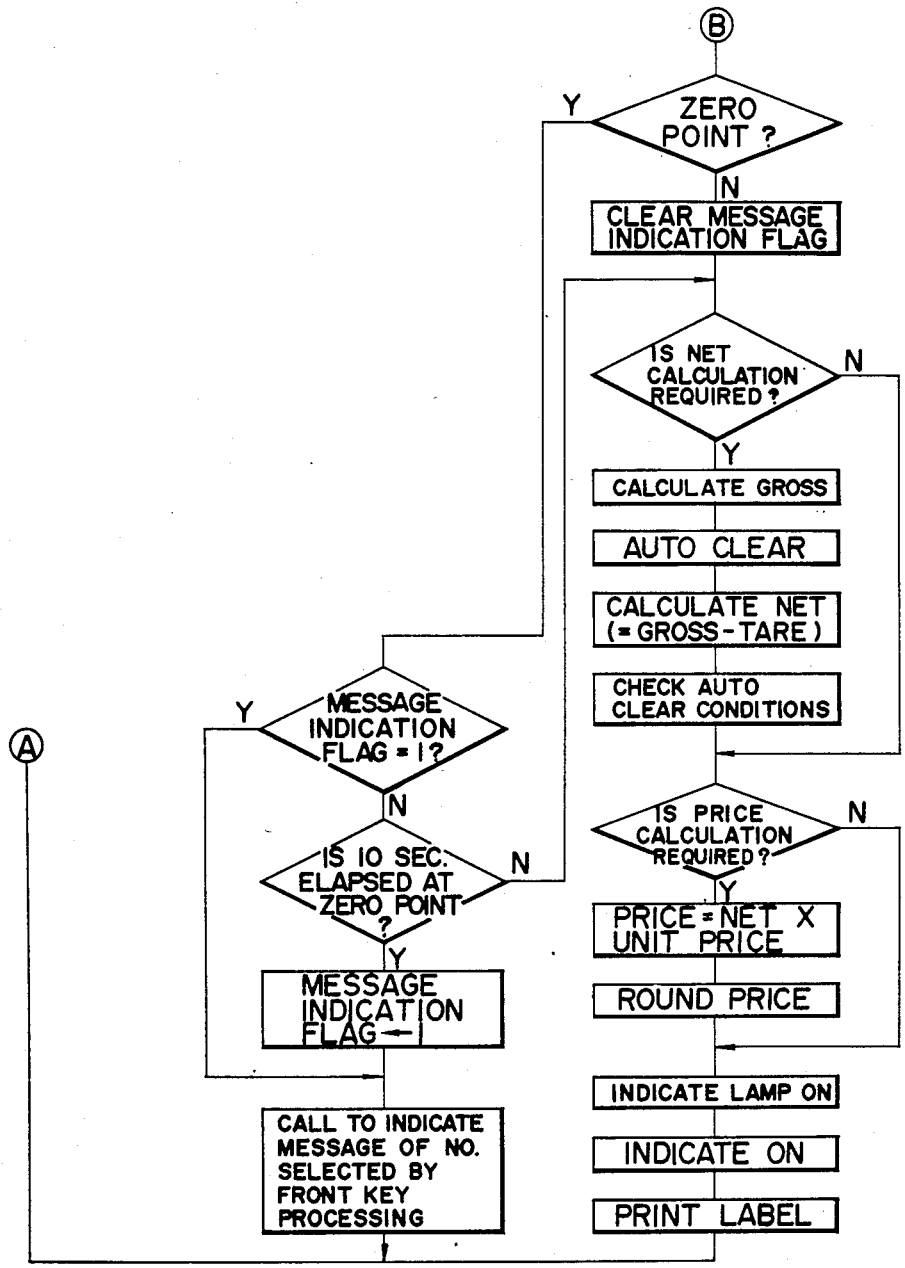

There will be now described the whole operation with reference to a flow chart as shown in FIGS. 5 and 6. Referring to FIG. 5 which shows the operation of preparatory step, power is first applied to clear a memory and initialize I/O. Then, the dip switch 20 is read to recognize various modes, and the registered mode selector switch 7 is read. It is checked whether the indication is ON or OFF. Namely, ON means indication, while OFF means no indication.

In the case that the indication is ON, segment check is carried out by repeating "0-9" and OFF. If balance data is unstable, segment check is then carried out by repeating "8" and OFF. When the balance data become stable, a zero range is checked, and then power failure is detected. Then, the routine goes to the flow in FIG. 6.

In the case that the indication is OFF, the balance data are read, and balance data processing is carried out. Then, it is checked whether or not an elapsed time from start exceeds 16 seconds. Then, the dip switch 20 is read, and the registered mode selector switch 7 is read to check ON and OFF of the indication again. If the indication is OFF, it is repeated that the balance data are read and the balance data processing is carried out. If the indication is ON, the routine goes to the aforementioned step of the segment check by the repetition of "8" and OFF.

Referring next to FIG. 6, mode check and front switch check are carried out, and then it is checked whether or not the registered mode selector switch 7, etc. are operated. If the selector switch 7 is operated, a message indication flag is cleared. Then, if the registered mode selector switch 7 is OFF, the routine is returned. If not OFF, it is checked whether or not key operation has been carried out. If the key operation has been carried out, and the key is the front key 4, front key processing is carried out. If the key is the remote key 14, remote key processing is carried out. Then, indication of lamp, indication and clearance of message indication flag are sequentially effected. On the other hand, if the key operation has not been carried out, the balance data are read, and balance data processing is carried out. Then, auto-zero processing is carried out, and it is checked whether the registered mode selector switch 7 is ON or OFF. Then, data from a quartz timer (not shown) is read.

In the next step, it is checked whether or not data from the load cell 17 is zero. If the data is not zero, the message indication flag is cleared. Then, if net calculation is required, gross weight calculation, auto-clearance, net calculation and auto-clearance conditions check are sequentially effected. Then, if price calculation is required, the price is calculated, and is indicated with the lamp. Then, various data are indicated, and are printed on a label, thereafter the routine being returned.

On the other hand, if the data from the load cell 17 are zero, and an elapsed time at the zero point exceeds 10 seconds, the message flag is set to 1, and the preliminarily selected message is indicated on the item indicator 13. If the message flag has been already set at 1, the selected message is immediately indicated.

As is mentioned above, while the balance 1 with the item indicator 13 is not being operated, the item indicator 13 indicates a predetermined message. Accordingly, the item indicator 13 may be effectively utilized to contribute to easiness of information transmission to customers and improvement in image to a store.

Further, in a modified embodiment, message data may be transferred from an external equipment such as an inline or CMT instead of the message RAM 18a to the RAM 18.

What is claimed is:

1. In a balance having an item indicator for indicating an item upon setting of said item and registering of said item, an alternate display for the item indicator comprising preliminary setting of at least one messages to be indicated by said item indicator when a selected item has not been entered, storing said messages in a memory, indicating said item upon setting of said item and when weight indication is greater than zero and selectively calling said messages by a control means to indicate said messages by said item indicator when weight indication is zero or less than zero and this condition continues for a fixed time.

2. The indication method according to claim 1, wherein plural kinds of said memories for storing plural kinds of messages are provided, said memories being exchangeable with each other, and an arbitral message is selectively accessed from said memories to be indicated.

3. The indication method according to claim 1, wherein an indication pattern of said messages is set simultaneously with setting of said messages, and is stored in a memory.

4. The indication method according to claim 1, wherein message data are transferred from an external equipment to said memories.

* * * * *